Nov. 12, 1935. W. FILLMANN 2,020,463
FLUSH TANK VALVE ASSEMBLY
Filed Jan. 2, 1930
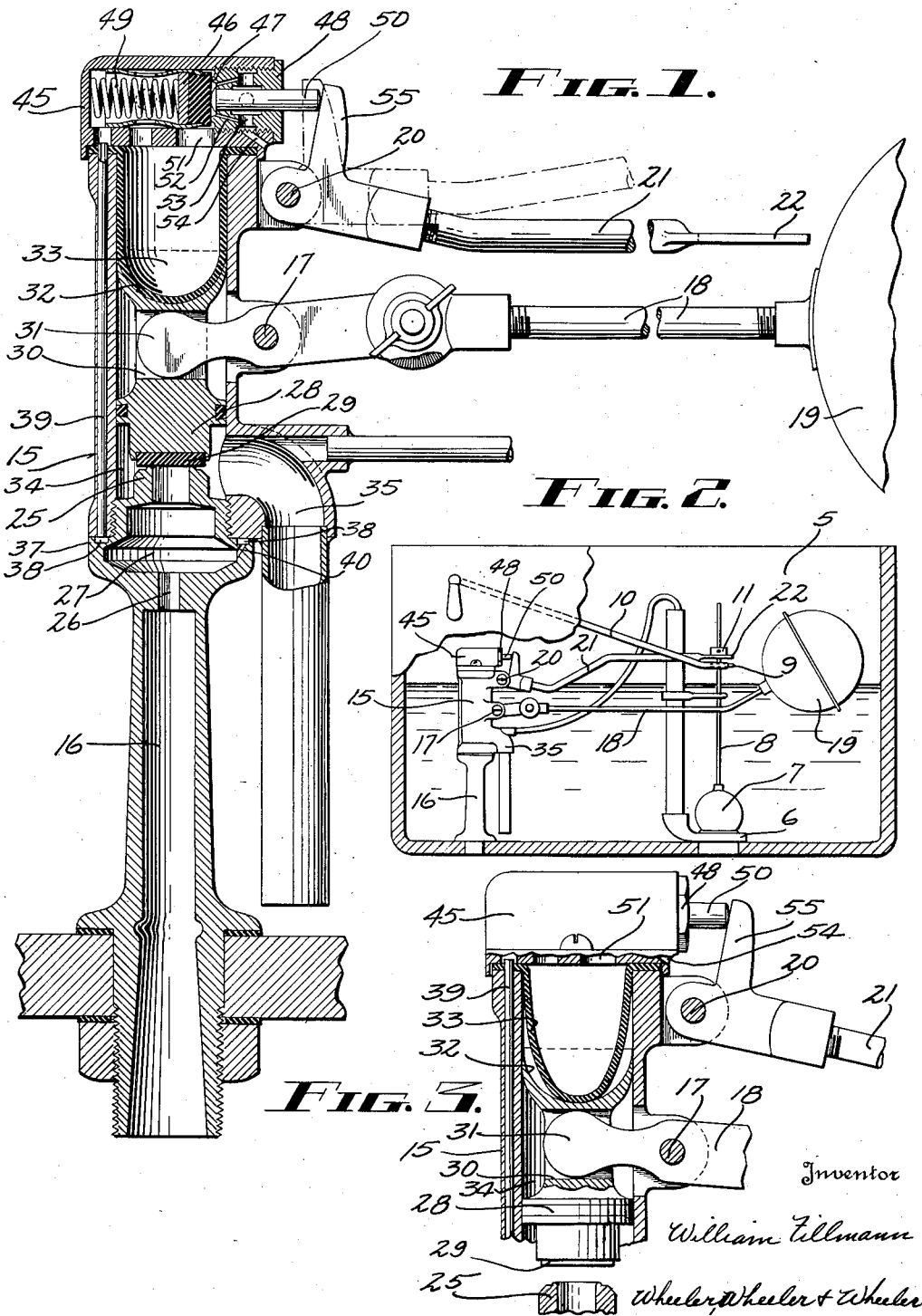

Patented Nov. 12, 1935

2,020,463

UNITED STATES PATENT OFFICE 2,020,463

FLUSH TANK VALVE ASSEMBLY

William Fillmann, Milwaukee, Wis.

Application January 2, 1930, Serial No. 417,972

12 Claims. (Cl. 137—104)

This invention relates to improvements in flush tank valve assemblies.

It is the primary object of the invention to provide a novel and improved float controlled valve which is particularly adapted for use in flush tanks, and is provided with pilot valve means operable independently of the float and controlled, in a flush tank assembly, by a connection with the means which actuates the flush valve. One purpose of this arrangement is to avoid loss of water which would be occasioned if the flush valve had a serious leak, such loss being prevented by the fact that the pilot valve controlling the refilling of the tank is released by means entirely independent of the float.

It is a further important object of the invention to provide an improved and more effective design for the refill valve.

In the drawing:

Figure 1 shows, in vertical axial section, valve mechanism embodying this invention.

Figure 2 shows such mechanism in side elevation, when operatively mounted in a flush tank and associated with the controls therein.

Figure 3 is a detailed view, showing a fragmentary section similar to Figure 1, with the parts in the positions which they occupy when the refill valve is open as during the filling of the tank.

Like parts are identified by the same reference characters throughout the several views.

The flush tank 5 is provided at 6 with a seat for the usual ball type of flush valve 7 which is guided by means of valve stem 8 for vertical reciprocation, when acted upon by the engagement of forked end 9 of the manually operated lever 10 with a collar 11 on the stem.

The valve casing 15, mounted on water inlet pipe 16, provides a fulcrum at 17 for the lever 18 which carries the usual float 19. It also provides at 20 a fulcrum for an additional lever 21 having a forked extremity 22 interposed between the manually operable lever 10 and the collar 11 for reasons presently to be described.

The water pipe 16 leads to a valve seat at 25 through a constricted port 26 and a chamber 27. Coacting with seat 25 is a piston like valve member 28 preferably having in its valve face a yieldable insert 29 of rubber or some soft metal such as lead. The intermediate portion of valve member 28 is slotted at 30 to receive the rounded extremity 31 of float lever 18. The upper end of the valve member is recessed at 32 to receive the spherical end of a diaphragm sack 33 of the form clearly illustrated in the drawing. The diaphragm comprises some resilient substance such as live rubber.

Below the valve member 28 and surrounding seat 25 is a chamber 34 which directly communicates through pipe 35 with the interior of flush tank 5 so that when the valve member 28 is lifted from the seat, as shown in Figure 3, the water supplied through pipe 16 will find direct access to the flush tank 5 for the filling thereof.

It will be noted that the pipe 16 comprises a special fitting to the upper end of which valve casing 15 is threaded. In the shoulder 37, engaged by the valve casing, is an annular recess 38 with which, in any position of the pipe fitting 16, the by-pass duct 39 in the valve casing communicates. The annular channel 38 in turn is placed in communication with chamber 27 by means of a small opening at 40. The purpose of this arrangement is to supply water under pressure to the interior of the diaphragm 33 which actuates the main valve 28 in the closing movement thereof.

Secured upon the valve casing 15 with the upturned flange of diaphragm 33 as packing, is a chambered head 45 communicating with the by-pass duct 39 and containing a spring pressed auxiliary valve 46 operating against a seat 47 in a centrall bored plug 48. Provision is made for conducting water entering the chambered head through duct 39 about the valve guide to the interior of the diaphragm 33. When the valve 46 is forced from its seat against the pressure of spring 49, by means of pin 50, the water may escape from the interior of diaphragm 33 through the ducts 51, 52, 53 and 54 to the interior of the tank. Pin 50 is controlled by an arm 55 on lever 21 previously described.

The operation of the device is as follows:

The flush tank being full of water as shown in Figure 2, the float 19 will be elevated so that its lever extremity 31 will press downwardly on the valve member 28, forcing such member upon its seat. The pressure of the float is not relied upon to maintain the valve seated, however, and the valve would stay seated even if the flush tank, through leakage, had lost its content of water. The diaphragm sack 33, expanded by water supplied thereto through the by-pass duct 39 furnishes the pressure which actually seats the valve and maintains it seated.

When the flush valve 7 is opened manually, the lever 21 is oscillated upwardly toward the position indicated in dotted lines in Figure 1, this movement being effected by engagement of the forked portion 9 of lever 10 with the forked portion 22 of lever 21. The upward movement of lever 21 actuates push rod 50 to trip or unseat pilot valve 47, whereby the pressure within diaphragm 33 is relieved. The arrangement is such that the capacity of the pilot valve exceeds the capacity of the by-pass duct 39 so that the water arriving through the by-pass duct cannot immediately build up pressure destroyed by the opening of the pilot valve.

If, for any reason, the level of water in the tank failed to drop following the tripping of the pilot valve, it will be obvious that the float 19 would maintain the primary valve 28 upon its seat. If, however, the tripping of the pilot valve is followed immediately by a drop of the water level in the tank 5, as is normally the case, the float 19 will tend to fall and the valve 28 will open responsive to the weight of the float 19 and to the water pressure on the face of the valve. Figure 3 shows valve 28 open to the extent permitted by the resilient coaction of diaphragm 33 upon relief of the pressure therewithin.

The spacing between the open valve 28 and its seat at 25 is sufficiently great so that the flowage capacity through the open valve exceeds the capacity of the restricted port 26 in the supply pipe. In view of this arrangement, it will be obvious that all water admitted to chamber 27 from the supply pipe will find a ready escape through the valve seat 25 and the discharge port at 35 without building up any material pressure in chamber 27. There being no material pressure in such chamber, there will be no flow of water through by-pass duct 39 such as could build up pressure within the control diaphragm 33.

When the tank has emptied and flush valve 7 has closed, the pilot valve 47 being already closed responsive to the pressure of its spring 49, the float 19 will ultimately be lifted by the rising level of water within the flush tank and the movement of the float will be transmitted for the actuation of valve 28 toward its seat. The initial movement of the valve will have no immediate effect since the capacity of the valve opening materially exceeds the capacity of the port 26. When the valve is nearly shut, however, the capacity of the remaining opening between the valve and the seat will become so reduced in proportion to the capacity of port 26, that sufficient pressure will be built up in chamber 27 to establish a transmission of such pressure by the flow of water through duct 39 to expand the diaphragm 33. As soon as this status is brought about, the valve 28 becomes subject not only to the action of the float, but also to the pressure of the diaphragm and consequently its closing movement is accelerated. Such acceleration, however, increases the pressure in chamber 27 and correspondingly increases pressure on the diaphragm so that the final movement of the valve to its seat is effected primarily by diaphragm pressure and is quite rapid.

Due to the fact that the closing of the valve depends upon the building up of water pressures and the transmission of such pressures through a very small duct such as that illustrated at 39, the valve will close without water-hammer, but its relatively quick and accelerating movement is such that "wire drawing" effects and whistling sounds are positively eliminated. Thus it is possible to use a much smaller float than is customarily employed and to accomplish a decisive power actuated movement of the supply valve to its seat while providing for approximately full flow of water into the tank throughout almost the entire time the valve remains open, the closing movement of the valve being accomplished without injury to the valve mechanism or objectionable noise.

I claim:

1. The combination with a valve of a float mechanically connected with said valve to control movement thereof, and a tripping mechanism provided with fluid pressure means for restraining the opening movement of said valve by said float until said trip is actuated, and manually operable controlling means for said tripping mechanism.

2. The combination with a valve of a float mechanically connected with said valve pressure means opposing the opening thereof and adapted to maintain said valve closed in opposition to said float and a trip device operatively arranged to release said pressure means and provided with an actuator independent of the float.

3. The combination with a supply fitting provided with an inlet port and a valve controlling said port, of a float mechanically connected with the valve, a pressure chamber having a movable wall independent of and freely engaging said valve in a direction to press it toward its seat and adapted to maintain said valve closed in opposition to said float, a by-pass duct from said inlet fitting to said pressure chamber, and a pilot valve in said chamber.

4. The combination with a supply fitting provided with an inlet port and a valve controlling said port, of a float operatively connected with the valve, a pressure chamber having a movable wall independent of and freely engaging said valve in a direction to press it toward its seat and adapted to maintain said valve closed in opposition to said float, a by-pass duct from said inlet fitting to said pressure chamber, and a pilot valve in said chamber, said pilot valve being provided with control means independent of said float.

5. The combination with a supply fitting provided with an inlet port and a valve controlling said port, of a float operatively connected with the valve, a pressure chamber having a movable wall independent of and freely engaging said valve in a direction to press it toward its seat and adapted to maintain said valve closed in opposition to said float, a by-pass duct from said inlet fitting to said pressure chamber, and a pilot valve in said chamber, said duct having a flowage capacity sufficiently less than that of said pilot valve, that the pressure in said chamber will not be re-established immediately upon closure of said pilot valve.

6. The combination with a supply fitting having a seat, of a valve movable to and from said seat, a float loosely connected with said valve and adapted to initiate movement thereof to its seat, and means operative upon an initial movement of said valve toward its seat for completing the seating movement of the valve independently of the float, said means comprising a deformable sack positioned to impart closing movement to the valve when said sack is extended by pressure, and said sack being of an area sufficient to maintain said valve closed in opposition to said float, a by-pass duct communicating with said sack and with said supply fitting adjacent said seat, a trip valve for relieving said sack of pressure, and means in said fitting providing for a relatively large fluctuation in pressure in said by-pass duct upon opening and closing of said valve.

7. The combination with a supply fitting having an inlet passage and a seat, of a valve movable to and from said seat, a float loosely connected with said valve and adapted to initiate movement thereof to its seat, and means operative upon an initial movement of said valve toward its seat for completing the seating movement of the valve independently of the float, said means comprising flow restriction means in said inlet passage, a pressure chamber having a movable wall operatively connected to impart closing movement to the valve when said chamber is subjected to pressure, a constantly open by-pass duct communicating with said chamber and with said supply fitting between said seat and said restricting means, and a trip valve for relieving said chamber of pressure, the effective area of pressure on the movable wall of the chamber exceeding the pressure area of said valve and being sufficiently in excess thereof that the pressure in said fitting occasioned by the initial closing of said valve and transmitted to said chamber is great enough to accelerate the closing movement thereof, and in excess of the valve opening force of said float and the pressure against said valve.

8. The combination with a supply fitting having a seat, of a restriction in said fitting positioned to determine the flow past said seat, a valve movable to and from said seat, a float loosely connected with said valve and adapted to initiate movement thereof to its seat, and means operative upon an initial movement of said valve toward its seat for completing the seating movement of the valve independently of the float, said means comprising a pressure chamber having a movable wall operatively connected to impart closing movement to the valve when said chamber is subjected to pressure, a constantly open by-pass duct communicating with said chamber and with said supply fitting between said restriction and said seat, the effective area of pressure on the movable wall of the chamber exceeding the pressure area of said valve, and being proportioned to maintain said valve seated in opposition to the unseating force of said float whereby pressure in said fitting occasioned by the initial closing of said valve is transmitted to said chamber to accelerate the closing movement thereof, and a pilot relief valve for said chamber provided with means normally maintaining it closed independently of said float, whereby the closing of said first mentioned valve is effected substantially exclusively by differential pressures established by its initial movement toward a closed position.

9. The combination with a pressure chamber provided with a delivery port and a restricted supply inlet of a valve controlling said port, said restriction being sufficient to cause a change in pressure in said chamber upon operation of said valve, and of a character to form a jet directed to avoid the walls of said chamber, a pressure device operatively connected to actuate said valve to shut off said port when said pressure device is subjected to pressure, a by-pass duct leading through a wall of said chamber and connecting with said pressure device and subject to changes in pressure in said chamber, and means for initiating a closing movement of said valve to the point where pressure is established in said chamber, and means for relieving the pressure in said device whereby to permit the opening of said valve.

10. In a device of the character described, the combination with a valve casing provided with a seat and a bore adjacent thereto, of a valve operable in said bore to control flow past said seat, a constantly open by-pass duct leading from the pressure side of said seat to a point beyond the valve, restricted inlet means in said casing for directing the flow therethrough in a well defined jet aligned with said seat and avoiding said by-pass duct, a head for said casing provided with a pressure chamber with which said by-pass duct communicates, and a diaphragm in said bore having a face exposed to pressures in said chamber and engaged with said valve in a direction for the pressure engagement thereof upon said seat, and means independent of said diaphragm for initiating valve movement toward its seat.

11. The combination of a ported supply fitting, a pressure actuated supply valve associated with the port of said fitting, a float connected with said valve and adapted to initiate the movement thereof, means including a permanently open by-pass and an inlet restriction limiting the capacity of said inlet to substantially less than that of said port for establishing pressures for the closing of said valve upon the initial movement of said valve, a fluid motor subject to said pressures and proportioned to positively close said valve in opposition to said float, and means for relieving such pressures to permit the opening of said valve, said means being independent of said float.

12. The combination with a supply fitting having an inlet passage and a seat, of a valve movable to and from said seat, a float loosely connected with said valve and adapted to initiate movement thereof to its seat, and means including a restriction in said inlet passage, and a constantly open by-pass connected between said restriction and said seat to be subject to substantial increase in pressure upon an initial movement of said valve toward its seat for completing the seating movement of the valve independently of the float, said means including a pressure operated motor of sufficient power to maintain said valve on said seat in opposition to said float and means for relieving said motor of pressure to allow opening movement of said valve.

WILLIAM FILLMANN.